United States Patent [19]

Hirayama et al.

[11] Patent Number: 5,498,409
[45] Date of Patent: Mar. 12, 1996

[54] MATERIAL FOR ADSORBING PYROGEN

[75] Inventors: Chuichi Hirayama, 373-12, Shimonabe-machi, Kumamoto-shi, Kumamoto-ken; Keijun Hiraoka; Sunao Morimoto, both of Yatsushiro, all of Japan

[73] Assignees: Chuichi Hirayama, Kumamoto; Kohjin Co., Ltd., Tokyo, both of Japan

[21] Appl. No.: 15,883

[22] Filed: Feb. 10, 1993

Related U.S. Application Data

[63] Continuation of Ser. No. 675,003, Mar. 26, 1991, abandoned.

[30] Foreign Application Priority Data

Mar. 27, 1990 [JP] Japan ................... 2-80095

[51] Int. Cl.$^6$ .................. A61K 31/785; C08L 79/00
[52] U.S. Cl. .................. 424/78.36; 424/78.14; 424/78.17; 424/78.3; 424/34.1; 424/34.2; 424/34.3; 424/57; 424/224; 424/364; 424/902; 424/903; 521/50; 521/99; 521/134; 524/35; 525/178; 525/186; 525/420; 525/437; 528/424
[58] Field of Search .................. 428/34.1, 34.2, 428/34.3, 224, 364, 57, 902, 903; 521/50, 99, 134; 524/35; 525/178, 186, 420, 437; 528/424; 424/78.14, 78.17, 78.3, 78.36

[56] References Cited

U.S. PATENT DOCUMENTS

| | | | |
|---|---|---|---|
| 3,355,437 | 11/1967 | Tesoro et al. | 528/73 |
| 3,632,556 | 1/1972 | Pittman et al. | 528/44 |
| 3,857,782 | 12/1974 | Crowley | 210/22 |
| 4,167,618 | 9/1979 | Schmitt et al. | 528/424 |
| 4,381,239 | 4/1983 | Chibata et al. | 210/679 |
| 4,613,543 | 9/1986 | Dabi | 525/375 |
| 4,680,174 | 7/1987 | Jarvis, Jr. et al. | 435/70.21 |
| 4,707,266 | 11/1987 | Degen et al. | 521/27 |
| 5,114,585 | 5/1992 | Kraus et al. | 210/490 |
| 5,136,032 | 8/1992 | Nagamatsu et al. | 210/651 |
| 5,154,829 | 10/1992 | Degen et al. | 210/638 |
| 5,401,499 | 3/1995 | Hirayama et al. | 424/78.14 |

FOREIGN PATENT DOCUMENTS

| | | |
|---|---|---|
| 0054778 | 6/1982 | European Pat. Off. . |
| 0252588 | 1/1988 | European Pat. Off. . |
| 62-19178 | 1/1987 | Japan . |
| 62-225244 | 10/1987 | Japan . |
| 1-127039 | 5/1989 | Japan . |
| 844686 | 8/1960 | United Kingdom . |

OTHER PUBLICATIONS

Database WPIL, accession No. 89–303483 [42], Derwent Publications Ltd, London, GB; & JP-A-1 211 496 (Denki Kagaku Kogyo K.K.) *Abstract*.

Chemical Abstracts, vol. 91, No. 16, Oct. 1979, p. 33, abstract No. 124414m, Columbus, Ohio, US; & JP-A-79 81 184 (Unitika Ltd) 28 Jun. 1979 *Abstract*.

*Primary Examiner*—James J. Seidleck
*Assistant Examiner*—Rabon Sergent
*Attorney, Agent, or Firm*—Nikaido, Marmelstein, Murray & Oram

[57] ABSTRACT

An insoluble material for adsorbing a pyrogen comprising a polymer of an aziridine compound. According to the present invention, a large amount of the pyrogen can be easily removed from a solution containing pyrogen, and a large amount of the material for adsorbing the pyrogen can be prepared in easy steps. Therefore, the adsorbing material can greatly contribute to the preparation of medicines.

27 Claims, No Drawings

MATERIAL FOR ADSORBING PYROGEN

This application is a continuation of application Ser. No. 07/675,003, filed Mar. 26, 1991, now abandoned.

BACKGROUND OF THE INVENTION

The present invention relates to a material for adsorbing a pyrogen. A representative example of substances well known as pyrogen is endotoxin.

Endotoxin is one of complex phospholipid polysaccharides which generally exist as a cell wall outermembrane component such as Gram-negative bacterium, is a typical pyrogen, and is so thermally stable as it cannot be decomposed even under steam sterilization under pressure. If endotoxin enters into blood of human or mammals without passing through a digestive tract, it causes strong exothermic reaction, vasconstriction, increase of sensitivity to adrenalin or acceleration and subsequently lowering of blood coagulation, thus resulting in, sometimes, death due to shock. Accordingly, there are never contaminated with endotoxin waters for injection, physiological saline, transfusions containing nutritions such as glucose or vitamins, dialysis solutions for blood dialysis, transfusions containing proteins such as albumin, and the like.

For removing bacteria, it is general to conduct the filtration by using a porous membrane having a pore size of about 0.2 μm. However, endotoxin can be insufficiently removed by conducting only the filtration, since if bacteria exist, it is usual that endotoxin exists together with bacteria, and moreover endotoxin has a high molecular weight and a very broad molecular weight distribution.

Although, for instance, Japanese Unexamined Patent Publication No. 62-19 178, No. 63-243022 or No. 1-127039, or Minobe et al, Journal of Chromatograph, 262, 193–198 (1983) proposes an ion exchange resin and its converted one, or various polymers having a functional group, sufficient effects cannot be obtained.

An object of the present invention is to provide a material for adsorbing the pyrogen, used as a means for effectively removing the pyrogen such as endotoxin, namely, to provide an adsorbing material capable of removing the pyrogen such as endotoxin so that it does not substantially exist in substances to be directly injected into blood without passing through a digestive tract, for instance, medicines such as biological products, water for injection, and the like.

Further object of the present invention is to provide a preparation process for the above-mentioned adsorbing material of the pyrogen.

A still further object of the present invention is to provide a method for removing the pyrogen such as endotoxin by using the above-mentioned adsorbing material.

These and other objects of the present invention will become apparent from the description hereinafter.

SUMMARY OF THE INVENTION

It has now been found that when a material for adsorbing a pyrogen is prepared from a polymer of an aziridine compound as a main component (in other words, as an adsorptive substance for the pyrogen), the above-mentioned objects can be attained.

In accordance with the present invention, there is provided an insoluble material for adsorbing a pyrogen comprising a polymer of an aziridine compound.

DETAILED DESCRIPTION

The material for adsorbing the pyrogen of the present invention must be insoluble in a solution or suspension containing the pyrogen such as endotoxin (herinafter referred to as "solution to be treated"). The solution to be treated is usually an aqueous solution or an aqueous suspension, so it is preferable that the adsorbing material is water-insoluble.

The aziridine compound used in the present invention is a compound containing at least one group derived from aziridine (aziridine group) in one molecule. The aziridine group may be substituted by a substituent such as a substituted or unsubstituted alkyl group or a substituted or unsubstituted aryl group. In the present invention, the adsorbing material for the pyrogen is prepared from a polymer of the aziridine compound.

The polymer of the aziridine compound includes a homopolymer of the aziridine compound, a copolymer prepared from the aziridine compound, and the like.

More concretely, the aziridine compounds used in the present invention include compounds having the formula (I):

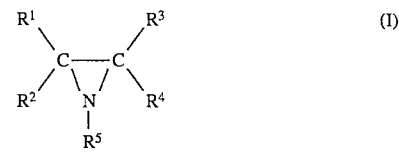

wherein $R^1$, $R^2$, $R^3$, $R^4$ and $R^5$ are the same or different and each is hydrogen atom, a substituted or unsubstituted aliphatic group, a substituted or unsubstituted aromatic group or a halogen atom.

Specific examples of the aziridine compounds are, for instance, ethyleneimine, propyleneimine, butyleneimine, N-hydroxyethyl ethyleneimine, N-cyanoethyl ethyleneimine, N-methyl ethyleneimine, N-phenyl ethyleneimine, N-acetyl ethyleneimine, N-methacryloylaziridine, β-aziridinylmethyl propionate, β-aziridinylethyl methacrylate, hexamethylene-bis-1,6-N,N'-diethyleneurea, diphenylmethane-bis-4,4'-N, N'-diethyleneurea, 2,2-bishydroxymethylbutanol-tris[3-(1-aziridinyl) propionate], and the like. The aziridine compounds may be used alone or as an admixture thereof. The polymer used in the adsorbing material contains units of the above-mentioned aziridine compound. In the present invention, not only copolymers prepared from the different kinds of the above-mentioned aziridine compounds but also copolymers prepared from the aziridine compound and another copolymerizable compound with the aziridine compound can be used. Further, there can be usefully used a block-copolymer prepared by block-copolymerizing the polymer of the aziridine compound with a vinyl polymer having a functional group reactive with the polymer of the aziridine compound at its polymer ends, since the block-copolymer can give to the adsorbent the moldability such as film-moldability or fiber-moldability, the strength, the insolubility, and the like as mentioned below. The copolymer of the aziridine compound with the other copolymerizable monomer or the above-mentioned block-copolymer has a content of the aziridine component of at least 5% by weight, preferably at least about 20% by weight, from the viewpoint of the adsorptivity.

Also, the polymer of the aziridine compound can be used in the states of a salt with an organic or inorganic acid or an amide.

The thus prepared polymer of the aziridine compound can be crosslinked by using a suitable crosslinking agent, for imparting the insolubility (water-insolubility) and further imparting the durability to the adsorbing material. Any compound can be used as the crosslinking agent so long as the compound contains two or more functional groups capable of forming covalent bond by the reaction with the functional groups of the polymer of aziridine compound, that is, imino group, the primary amino group or the secondary amino group in one molecule. Examples of the crosslinking agents are, for instance, epoxy resins such as novolak phenol epoxy resins and bisphenol epoxy resins; epihalohydrines such as epichlorohydrine and epibromohydrine; polyhalohydrines such as glycerol dichlorohydrine; polyhalogen compounds such as p-dichloroxylene and dibromodimethylene; polyaldehyde compounds such as glutaric dialdehyde and xylyl dialdehyde; polyisocyanate compounds such as tolylenediisocyanate and hexamethylenediisocyanate, and the like. These crosslinking agents may be used alone or as an admixture thereof.

In the present invention, it is desirable that a shaped adsorbent is formed from the polymer of the aziridine compound alone, or together with a forming material or a supporting material. The shaped adsorbent can take any of effective shapes for adsorbing the pyrogen such as endotoxin, for instance, a fiber, film, sheet, paper, non-woven fabric, hollow yarn (hollow article), particle, foam, block- (mass), and the like.

The shaped adsorbent of the present invention is prepared by the following methods, which are divided broadly into three embodiments.

(1) The crosslinked or non-crosslinked polymer of the aziridine compound is formed into an insoluble adsorbent having the shape as mentioned above.

(2) The polymer of the aziridine compound is admixed with the forming material which is compatible with the polymer and, using the crosslinking agent or not, the mixture is formed into an insoluble shaped adsorbent.

(3) The surface of the supporting material such as an existing insoluble fiber, sheet, hollow article or sponge is coated or impregnated with the polymer of the aziridine compound and, if necessary, the polymer is crosslinked ( it is possible that the polymer is not crosslinked) to give an insoluble shaped adsorbent.

As the forming material or the supporting material used in the above-mentioned embodiments (2) and (3), there can be used any materials including usual orientable polymers, that is, any material capable of forming into the shaped adsorbent, for instance, which is in the state of a film, sheet, paper, non-woven fabric, hollow article, particle, foam or block, or any materials constituting the shaped adsorbent can be used. Generally, there can be used regenerated celluloses, poval (polyvinyl alcohol), polyacrylonitrile, nylon, polyolefins, polyesters, modified polymers thereof, and the like. Also, shaped products prepared therefrom can be used.

The adsorbent of the present invention can be formed in any known manner in the art, for instance, usual molding methods for polymers such as extrusion, usual preparation methods for fibers, and the like.

For instance, when a fibrous adsorbent is prepared by using a regenerated cellulose as the forming material in the embodiment (2), the polymer of the aziridine compound is added to a starting solution containing the usual regenerated cellulose and the fibrous adsorbent is prepared according to the usual spinning method for the regenerated cellulose. More concretely, a regenerated cellulose is prepared in a manner wherein a composition used for preparing a regenerated cellulose such as rayon or cellophane, for instance, a viscose is extruded into a coagulation bath wherein sulfuric acid and sodium sulfate exist as main components through pores or slits to coagulate, in other words, to convert into cellulose. The viscose is obtained, for instance, by impregnating a pulp with cautic soda (sodium hydroxide) to give an alkali cellulose, adding $CS_2$ to the obtained alkali cellulose to give a sodium cellulose xanthogenate, and adding diluted sodium hydroxide used for solving to the sodium cellulose xanthogenate. The viscose has usually 4 to 10% by weight of cellulose and 4 to 7% by weight of sodium hydroxide. On the other hand, the coagulation bath contains usually 80 to 150 g/l of sulfuric acid and 180 to 370 g/l of sodium sulfate, and further in case of preparing rayon, may contain 10 to 20 g/l of zinc sulfate.

In the present invention, the polymer of the aziridine compound is added to the viscose and the mixture is extruded into the coagulation bath to coagulate, whereby a regenerated cellulose composition having not less than 50% by weight, based on the added polymer of the aziridine compound to the coagulation bath, of the polymer of the aziridine can be obtained.

Although there are many cases that the polymer of the aziridine compound itself is water-soluble, in the regenerated cellulose composition containing the polymer of the aziridine compound, it is bonded to the cellulose molecule by strong interaction such as hydrogen bond. Therefore, it is not eluted from the composition as a water-soluble substance at all, and it behaves as if it is graft-polymerized on the cellulose. Accordingly, the regenerated cellulose composition having the polymer of the aziridine compound which is prepared by a usual method for producing regenerated cellulose is a polymer composition having substantially no water-soluble substance, and the thus obtained regenerated cellulose composition can be used as a material for efficiently removing endotoxin, even if the polymer of the aziridine compound is not crosslinked (in other words, is not made insoluble).

When using polyacrylonitrile, an aqueous solution of polyacrylonitrile containing zinc chloride or an acetone solution of polyacrylonitrile is prepared, and when using nylon, polyolefine or polyester, they are molten in a calender or an extruder. Then, the polymer of the aziridine compound is added to the aqueous or acetone solution or the molten one, and the mixture is formed into the adsorbent having the desired shape in a usual manner.

The adsorbing material can take any desired shape such a fiber, film, hollow yarn, block, bead, powder or sponge, and further it can be formed into products having various states such as a spun yarn, cloth, non-woven fabric, paper, membrane, honeycomb and composite material, e.g., a laminate.

In the present invention, only to instantly contact the solution containing the pyrogert such as endotoxin (the solution to be treated) with the adsorbing material at room temperature, for instance from 0° to 40 ° C., suffices the removal for the pyrogen from the solution to be treated. As a removal method, there are exemplified a method wherein a column is charged with the fibrous or granular(particles) adsorbent and the solution to be treated is passed through the column; a method wherein the solution to be treated is filtered through a filter paper made of the adsorbent to give a filtrate; a method wherein the adsorbent in the state of beads is added to the solution to be treated and the mixture is stirred; a method wherein the solution to be treated is dialyzed by using the dialysis membrane made of the adsorbent in the state of the hollow fiber; and the like.

Further, various types of apparatuses for effectively and easily removing the pyrogen can be considered by using the adsorboing material of the present invention.

According to the present invention, apparatuses for effectively removing pyrogen can be easily and inexpensively provided by even considering that the solution to be treated is effectively contacted with the adsorbent.

According to the present invention, a large amount of pyrogen such as endotoxin, can be easily removed from the solution containing pyrogen, and the material for removing a large amount of the pyrogen can be prepared in very easy steps, so the adsorbent of the present invention can contribute to the preparation of medicines.

The present invention is more specifically described and explained by means of the following Examples in which all % and parts are by weight unless otherwise noted. It is to be understood that the present invention is not limited to the Examples, and various changes and modifications may be made in the invention without departing from the spirit and scope thereof.

In Examples 1–12 and Comparative Examples the pyrogen was detected by using "Toxinometer" commercially available from Wako Purechemical Industries, Ltd. and proteins were determined by using a spectrophotometer according to Beer's law.

EXAMPLE 1

Polyethyleneimine having a molecular weight of 70,000 was crosslinked with 20% by mole per monomer unit of polyethyleneimine of glyoxal or hexamethylenediisocyanate in a suitable medium to give a mass of crosslinked polyethyleneimine, and the obtained polyethyleneimine was pulverized to give particles having a particle size of 100 to 500 µm (adsorbent). A test tube was charged with 0.1 g of the adsorbent, 2 ml of an aqueous solution containing 360 ng/ml of endotoxin was poured into the tube and the tube was shaken at 37° C. for 30 minutes to contact endotoxin with the adsorbent.

In case of using the adsorbent of the particles of polyethyleneimine crosslinked with glyoxal, a concentration of endotoxin in the treated solution was 0.41 ng/ml. In case of using the adsorbent of the particles of polyethyleneimine crosslinked with hexamethylenediisocyanate, a concentration of endotoxin in the treated solution was 0.34 ng/ml. In the both cases, the endotoxin concentrations in the treated solutions were remarkably decreased, that is, the extremery excellent adsorptivity were shown in the both cases.

EXAMPLE 2

An aqueous solution of polyethyleneimine (hereinafter referred to as "PEI") having a PEI content of 15% was added to a viscose containing 9.5% of cellulose and 5.6% of sodium hydroxide so that the amount of PEI was 20% of cellulose and the mixture was stirred. The thus obtained viscose was extruded into a coagulation bath containing 112 g/l of sulfuric acid, 350 g/l of sodium sulfate, 15 g/l of zinc sulfate and water through a nozzle having 10,000 holes each having a diameter of 0.07 mm to coagulate. The obtained regenerated fiber was stretched 1.5 times at 95° C., and was cut to a length of 51 mm. The cut fiber was dipped in warm water having a temperature of 90° C., dehydrated, and washed with warm water having a temprature of 90° C., then an aqueous solution containing 4 g/l of sodium hydroxide and having a temperature of 80° C., and finally water. Subsequently, the fiber was bleached with a 15% aqueous solution of hydrogen peroxide having a temperature of 65° C. and was washed with water to complete the scouring. The fiber was dried at 105° C. to give a 2 d of regenerated cellulose fiber containing PEI as a sample [adsorbent 2-(1)]. A yield of PEI was 86%. The adsorbent 2-(1) was dipped in 1N sulfuric acid, 1N sodium hydroxide and pure water having a temperature of 90° C. for 10 minutes, respectively. In all of the three cases, the elution was not observed at all.

The obtained fiber [ adsorbent 2-( 1 )] was cut to a length of about 10 mm and a test tube was charged with 0.1 g of the cut fiber. Into the test tube was poured 2 ml of an aqueous solution containing 360 ng/ml of endotoxin and the tube was shaken at 37° C. for 30 minutes to contact endotoxin with the adsorbent 2-( 1 ). The treated solution had 0.84 ng/ml of endotoxin, and a removing ratio (adsorption ratio) of 99.8%, in other words, endotoxin could be removed in high efficiency.

The same procedure as above was repeated except that polypropyleneimine (hereinafter referred to as "PPI") was used instead of PEI to give a regenerated cellulose fiber containing PPI [ adsorbent 2-(2)]. A yield of PPI was 88.0%. The adsorption ratio of the adsorbent 2-(2) was measured in the same manner as the case that the adsorbent 2-(1) was measured. The result is shown in Table 1.

On the other hand, one of adsorbents obtained in Example 1, namely, the crosslinked PEI with glyoxal (glyoxal was used in an amount of 20% by mole per monomer unit of PEI) which was insoluble in water (hereinafter referred to as "PEC") was pulverized by using a wet grinding mechine commercially available under a trademark "Sand grinder" from Igarashi Kikai Seizo Kabushiki Kaisha to give particles with an average particle size of not more than 1 µm, and an aqueous suspension having 20% of the obtained particles of PEC was prepared.

The procedure for preparing the adsorbent 2-(1) was repeated except that the aqueous suspension containing the particles of PEC was added so that the amount of PEC particles was 20% of cellulose instead of PEI to give a regenerated cellulose containing PEC [adsorbent 2-(3)]. A yield of PEC was 98.7%. An adsorption ratio of endotoxin was measured in the same manner as that the adsorbent 2-(1) was measured. The results are shown in Table 1. As shown in Table 1, the adsorbent 2-(3) showed a remarkably high adsorption ratio of endotoxin.

EXAMPLE 3

The same aqueous solution of PEI as used in Example 2, the 15% aqueous solution of PEI was added to an aqueous solution containing 20% of poval with a degree of polymerization of 1500 to give an aqueous solution of poval containing 20% based on poval of PEI. The obtained aqueous solution was spun, using a coagulation bath of a saturated solution of Glauber's salt (sodium sulfate. 10$H_2O$) having a temperature of 45° C. through a nozzle having 20,000 holes each having a diameter of 0.08 mm to give a 2 d of vinylon containing PEI [adsorbent 3-(1)]. A yield of PEI was 87.3%.

Poval was spun in the same manner as above except that, instead of PEI, the same PPI as used in Example 2, that is, in the preparation of the adsorbent 2-(2) and the same PEC as used in Example 2, that is, in the preparation of the adsorbent 2-(3) were used respectively to give a vinylon containing PPI [adsorbent 3-( 2 )] and a vinylon containing PEG [ adsorbent 3-(3)]. A yield of PPI was 88.3 To and a yield of PEG was 98.8%.

As to each of the adsorbents 3-(1), 3-(2) and 3-(3), the adsorption ratio of endotoxin was measured in the same manner as in Example 2. The results are shown in Table 1.

EXAMPLE 4

PEI was added to an acetone solution of polyacrylonitrile (PAN) in an amount of 20% of PAN, and the obtained acetone solution of PAN containing PEI was dry spun through a nozzle having 2,000 holes each having a diameter of 0.1 mm to give a 2 d of PAN fiber containing PEI [adsorbent 4-(1)].

PAN was dry spun in the same manner as above except that the PPI and the PEG were used instead of PEI respectively to give a PAN fiber containing PPI [adsorbent 4-(2)] and a PAN fiber containing PEC [adsorbent 4-(3)].

As to each of the obtained adsorbents 4-(1), 4-(2) and 4-(3), an adsorption ratio of endotoxin was measured in the same manner as in Example 2. The results are shown in Table 1.

EXAMPLE 5

Nylon-6 pellets were molten in an extruder, to which PEI, PPI and PEG were added in an amount of 20% of Nylon-6, respectively, and each mixture was spun to give a 2 d of nylon fiber containing PEI [adsorbent 5-(1)], a 2 d of nylon fiber containing PPI [adsorbent 5-(2)] or a 2 d of nylon fiber containing PEG [adsorbent 5-(3)].

As to each of the adsorbents 5-(1), 5-(2) and 5-(3), an adsorption ratio of endotoxin was measured in the same manner as in Example 2. The results are shown in Table 1.

EXAMPLE 6

The same procedure of Example 4 was repeated except that polypropylene was used instead of Nylon-6 pellets to give a 2 d of polypropylene fiber containing PEI [adsorbent 6-(1)], a 2 d of polypropylene fiber containing PPI [ adsorbent 6-(2)] and a 2 d of polypropylene fiber containing PEC [ adsorent 6-( 3 )], respectively.

As to each obtained adsorbents 6-(1), 6-(2) and 6-( 3 ), an adsorption ratio of endotoxin was measured in the same manner as in Example 2. The results are shown in Table 1.

EXAMPLE 7

The same procedure of Example 6 was repeated except that a polyester was used instead of polypropylene to give a 2 d polyester fiber containing PPI [adsorbent 7-( 2)] and a 2 d of polyester fiber containing PEC [ adsorbent 7-(3)], respectively.

As to each of the adsorbents 7-(1), 7-(2) and 7-(3), an adsorption ratio of endotoxin was measured in the same manner as in Example 2. The results are shown in Table 1.

TABLE 1

| Ex. No. | Forming material | Polymer of aziridine | Adsorbent No. | Adsorption ratio (%) |
|---|---|---|---|---|
| Ex. 2 | Regenerated cellulose | PEI | 2-(1) | 99.6 |
| " | " | PPI | 2-(2) | 99.4 |
| " | " | PEC | 2-(3) | 99.8 |
| Ex. 3 | Poval | PEI | 3-(1) | 95.6 |
| " | " | PPI | 3-(2) | 94.8 |
| " | " | PEC | 3-(3) | 96.1 |
| Ex 4 | Polyacrylonitrile | PEI | 4-(1) | 90.7 |
| " | " | PPI | 4-(2) | 90.0 |
| " | " | PPI | 4-(3) | 91.3 |
| Ex. 5 | Nylon-6 | PEI | 5-(1) | 86.3 |
| " | " | PPI | 5-(2) | 84.9 |
| " | " | PEC | 5-(3) | 87.1 |

TABLE 1-continued

| Ex. No. | Forming material | Polymer of aziridine | Adsorbent No. | Adsorption ratio (%) |
|---|---|---|---|---|
| Ex. 6 | Polypropylene | PEI | 6-(1) | 81.1 |
| " | " | PPI | 6-(2) | 80.4 |
| " | " | PEC | 6-(3) | 82.3 |
| Ex. 7 | Polyester | PEI | 7-(1) | 83.1 |
| " | " | PPI | 7-(2) | 81.1 |
| " | " | PEC | 7-(3) | 84.2 |

EXAMPLE 8

The adsorbents 2-(1) and 3-(1) were crosslinked with glyoxal to give an adsorbent 2-(1)-G and an adsorbent 3-(1)-G, respectively. Also, the adsorbents 2-(1) and 3-(1) were crosslinked with hexamethylenediisocyanate to give and an adsorbent 2-(1)-H and an adsorbent 3-(1)-H.

Each of the adsorbents 2-(1)-G, 2-(1)-G, 3-(1)-G, 3-(1)-H, 2-(1) and 3-(1) was dipped in 1N sulfuric acid and then 1N-sodium hydroxide, and it was washed with pour water to give the adsorbent free from endotoxin (pretreatment).

A test tube was charged with 0.1 g of the adsorbent, 2 ml of an aqueous solution containing 250 ng/ml of endotoxin was poured into the test tube, and the tube was shaken at 37° C. for 30 minutes to contact endotoxin with the adsorbent (adsorption).

An endotoxin content in a supernatant fluid in the test tube was measured by using Toxinometer and an adsorption ratio of endotoxin (%) was measured. The procedure of the pretreatment and the adsorption was repeated 10 times, and an adsorption ratio in each time was measured. The results are shown in Table 2.

As shown in Table 2, the adsorbents wherein the polymer was crosslinked could be kept higher in adsorption ratio than the adsorbent wherein the polymer was not non-crosslinked in case of repeating the procedure of the pretreatment and the adsorption. In other words, the adsorbent of the crosslinked polymer is more excellent in repeated adsorptivity than the adsorbent of the non-crosslinked polymer.

TABLE 2

| | Adsorption ratio (%) | | | |
|---|---|---|---|---|
| Adsorbent No. | The first time | The second time | The 5th time | The 10th time |
| 2-(1) | 99.6 | 98.6 | 98.0 | 80.0 |
| 2-(1)-G | 98.9 | 99.2 | 98.5 | 98.6 |
| 2-(1)-H | 99.7 | 99.5 | 99.0 | 99.0 |
| 3-(1) | 95.6 | 95.4 | 90.6 | 73.5 |
| 3-(1)-G | 94.5 | 94.0 | 94.5 | 93.4 |
| 3-(1)-H | 95.0 | 96.0 | 96.2 | 96.4 |

EXAMPLE 9

An aqueous solution containing 15% of PEI was added to a viscose containing 9.5% of cellulose and 5.6% of sodium hydroxide in an amount of PEI of 20% based on cellulose, and the mixture was sprayed by pressured air and the coagulation was conducted in a coagulation bath of an aqueous solution containing 112 g/l of sulfuric acid, 350 g/l of sodium sulfate and 15 g/l of zinc sulfate to give particles with a particle size of 10 to 100 μm. The particles were washed with water and subjected to desulfuration with sodium hydroxide. Then, the particles were crosslinked with hexamethylenediisocyanate (the absorbent A).

The same viscose as above was added dropwise to the same coagulation bath as above through a nozzle to give particles having a particle size of 100 to 500 μm. The particles were purified in the same manner as above, and pulverized to give powder having a particle size of about 10 μm. The powder was crosslinked with hexamethylenediisocyanate (adsorbent B).

A test tube was charged with 0.1 g of each of the adsorbent 2-(1) (fibrous), adsorbent A (particles) and adsorbent B (powdery) which contained the same amount of PEI but were different in shape from each another, to which 2 ml of a solution containing 360 ng/ml of endotoxin was added, and the mixture was shaken at 37° C. for 30 minutes to contact endotoxin with the adsorbent. Adsorption ratios were measured and the results are shown in Table 3. As shown in Table 3, with respect to all of the three kinds of the adsorbents, the excellent adsorptivity was observed.

TABLE 3

| Adsorbent | Adsorption ratio (%) |
| --- | --- |
| 2-(1) (fibrous) | 99.6 |
| A (particles) | 99.4 |
| B (powder) | 99.7 |

TABLE 4

| Adsorbent | Adsorption ratio of endotoxin | Recovery of γ-globulin |
| --- | --- | --- |
| 10-(1) | 98.5 | 89.8 |
| 10-(2) | 99.3 | 90.0 |
| C | 80.0 | 75.2 |

EXAMPLE 11 AND COMPARATIVE EXAMPLES 2 AND 3

Each of the adsorbents 2-(1) and 2-(3), and an adsorbent D (Com. Ex. 2) which was commercially available under the trademark "C-7" from Kurita Water Industries Ltd., and the adsorbent E ( Com. Ex. 3 ) which was commercially available under the trademark "Pyrosep" from Daicel Chemical Industries, Ltd. was washed with 10 mM phosphate buffer containing 1.0M NaCl (pH:7.5) and no endotoxin, then 1 to 2 ml of a phosphate buffer containing 1.0M NaCl (pH 7.5) to which a bacterial toxoid contaminated with endotoxin was added was contacted with the washed adsorbent in a test tube. Endotoxin remaining in the supernatant fluid was measured. Adsorption ratios of the pyrogen are shown in Table 5.

TABLE 5

| Adsorbent No. | Amount of Adsorbent | Adsorption ratio (%) Kind of Toxoid | | |
| --- | --- | --- | --- | --- |
| | | Toxoid derived from Clostridium tetani | Toxoid derived from Clostridium tetani Initial pyrogen content | Toxoid derived from Corinebacterium diphtheria |
| | | 3933 ng/ml | 1080 ng/ml | 397 ng/ml |
| Ex. 11 2-(1) | 0.1 g | 85 | 95 | 99 |
| 2-(3) | 0.1 g | 80 | 90 | 97 |
| Com. Ex. 2 D | 0.200 g | 0 | 0 | 72 |
| Com. Ex. 3 E | 0.124 g | 20 | 4 | 54 |

EXAMPLE 10 AND COMPARATIVE EXAMPLE 1

A regenerated cellulose fiber containing about 17% based on cellulose of PEI was cut to a length of about 10 mm [adsorbent 10-(1)] and a test tube was charged therewith. The fiber in the test tube was washed with 10 mM phosphate buffer containing 0.1M NaCl (pH: 5), and 1 to 2 ml of phosphate buffer wherein 5 mg of bovine serum γ-globulin (pH:7.2) was dissolved was added to the test tube to contact. An amount of endotoxin remaining in the supernatant fluid was measured.

An adsorption ratio of endotoxin is shown in Table 4 together with a recovery of γ-globulin.

The recovery of γ-globulin was measured, using a spectrophotometer according to Beer's law.

Using a regenerated cellulose fiber containing 20% based on cellulose of PEC, [the adsorbent 10-(2)], the same procedure as above was repeated.

As to an adsorbent C which was commercially available under the trademark "C-9" from Kurita Water Industries Ltd., the same procedure as above was repeated.

As to the adsorbents 10-(2) and C, an adsorption ratio and a recovery of γ-globulin were shown in Table 4.

EXAMPLE 12

A regenerated cellulose fiber and a filter paper were dipped respectively in an aqueous solution containing 10% of polyethyleneimine having a molecular weight of 70,000 at 30° C. for 24 hours and then water was removed under reduced pressure at 40° C. The obtained products had 10%, based on the supporting material (regenerated cellulose fiber or filter paper), of polyethyleneimine. The obtained regenerated cellulose fiber to which polyethyleneimine was attached and the filter paper to which polyethyleneimine was attached was crosslinked in an aqueous solution containing 25% of glutaraldehyde to give adsorbents, respectively.

To 2 ml of a solution containing 360 ng/l of endotoxin was added 0.1 g of each adsorbent, and an adsorption ratio was measured.

The adsorbent wherein polyethyleneimine was attached to the regenerated cellulose fiber had an adsorption ratio of 85%, and the adsorbent wherein polyethyleneimine was attached to the filter paper had an adsorption ratio of 76%.

In addition to the ingredients used in the Examples, other ingredients can be used in the Examples as set forth in the specification to obtain substantially the same results.

What we claim is:

1. An insoluble adsorbent for adsorbing a pyrogen from a liquid containing said pyrogen comprising an article which is substantially insoluble in said liquid under adsorption conditions, which article consists essentially of a mixture of polymer of an aziridine compound consisting essentially of a sufficient amount of an aziridine constituent to adsorb pyrogen from said liquid, in admixture with another polymer that is compatible with said aziridine polymer.

2. The insoluble adsorbent of claim 1, wherein said polymer of anaziridine compound is crosslinked.

3. The insoluble adsorbent of claim 1, wherein said article is at least one of a fiber, film, sheet, paper, non-woven fabric, hollow product, particle, foam or block.

4. The insoluble adsorbent of claim 1 wherein said aziridine compound is at least one selected from the group consisting of ethyleneimine propyleneimine, butyleneimine, N-hydroxyethyl ethyleneimine, N-cyanoethyl ethyleneimine, N-methyl ethyleneimine, N-phenyl ethyleneimine, N-acetyl ethyleneimine, N-methacryloyl aziridine, β-aziridinylmethyl propionate, β-aziridinylethyl methacrylate, hexamethylene-bis-1,6-N,N'-diethyleneurea, diphenylmethane-bis-4,4'-N,N'-diethyleneurea and 2,2-bishydroxymethylbutanol-tris{3-1(1-aziridinyl) propionate}.

5. The insoluble adsorbent of claim 1 wherein said compound is ethyleneimine or propyleneimine.

6. The insoluble adsorbent of claim 1 made by the process of polymerizing said aziridine compound to form said aziridine polymer, which polymer has the ability to adsorb a pyrogen; mixing such aziridine polymer with said other polymer which is compatible with said aziridine polymer in proportions such that there is sufficient aziridine polymer to adsorb a pyrogen; and forming said mixture into said article which has the ability to adsorb a pyrogen.

7. The insoluble adsorbent of claim 1, wherein said other polymer is a member selected from the group consisting of a regenerated cellulose, a polyvinyl alcohol, a polyacrylonitrile, a nylon, a polyolefin and a polyester.

8. An adsorbent, suitable for adsorbing a pyrogen from a liquid containing said pyrogen, comprising an article, which is substantially insoluble in said liquid under conditions of adsorption, which article consists essentially of a mixture of:

a first polymer selected from the group consisting of a regenerated cellulose, a polyacrylonitrile and a polyvinyl alcohol, and a sufficient proportion of a second polymer, comprising a polymer of an aziridine compound, to adsorb a pyrogen from said liquid;

wherein said mixture is formed by:

adding said second polymer to a solution of said first polymer;

admixing said second polymer in said solution to form an admixture; and then subjecting said admixture to conditions sufficient to coagulate said first and second polymers out of said admixture as said article.

9. An adsorbent as claimed in claim 8 wherein said first polymer is a regenerated cellulose and said article is made by mixing said aziridine polymer into a viscose of unregenerated cellulose to form said admixture; and subjecting said admixture to conditions sufficient to regenerate said cellulose containing said aziridine polymer interspersed therewith.

10. An adsorbent as claimed in claim 8 wherein said first polymer is a regenerated cellulose and said article is made by mixing said aziridine polymer into a viscose of unregenerated cellulose to form said admixture; subjecting said admixture to conditions sufficient to regenerate said cellulose into a composition comprising regenerated cellulose containing said aziridine polymer interspersed therewith; and treating the resulting composition comprising regenerated cellulose having aziridine polymer interspersed therewith with a crosslinking agent under conditions sufficient to crosslink said aziridine polymer and to thereby form said article.

11. An adsorbent as claimed in claim 8 formed by coagulating an aqueous solution of a polyvinyl alcohol having admixed therewith said aziridine polymer, and treating the resulting composition with a crosslinking agent under conditions sufficient to crosslink said aziridine polymer and to thereby form said article.

12. An adsorbent as claimed in claim 8 formed by coagulating an aqueous solution of a polyvinyl alcohol having admixed therewith said aziridine polymer.

13. An adsorbent as claimed in claim 8 consisting essentially of an article of said mixture of said first and second polymers.

14. An adsorbent as claimed in claim 8 wherein said article is at least one of fiber, film, sheet, paper, cloth, non-woven fabric, hollow article, particle, foam, block, or honeycomb.

15. An adsorbent as claimed in claim 8 wherein said aziridine compound is at least one member selected from the group consisting of ethyleneimine, propyleneimine, butyleneimine, N-hydroxyethylethyleneimine, N-cyanoethylethylene imine, N-methyl ethyleneimine, N-phenyl ethyleneimine, N-acetyl ethyleneimine, N-methacryloyl aziridine, δ-aziridinylmethyl proprionate, δ-aziridinylmethyl methacrylate, hexamethylene-bis-1,6-N,N'-diethyleneurea, diphenylmethane-bis-4,4'-N,N'-diethyleneurea, and 2,2-bishydroxymethylbutanol-tris[3-(1-aziridinyl)proprionate].

16. An adsorbent as claimed in claim 8 wherein said aziridine polymer comprises the polymerization product of at least 5 weight percent of said aziridine compound and up to 95 weight percent of at least one other compound which is copolymerizable with said aziridine compound.

17. An adsorbent as claimed in claim 16 wherein said other compound contains at least one copolymerizable vinyl group.

18. An adsorbent as claimed in claim 16 wherein said polymer of an aziridine compound is a block copolymer formed by block copolymerizing a polymer of an aziridine compound with a vinyl polymer having terminal functional groups reactive with the polymer of the aziridine compound.

19. An adsorbent, suitable for adsorbing a pyrogen from a liquid containing said pyrogen, comprising an article, which is substantially insoluble in said liquid at conditions of adsorption, which article consists essentially of a mixture of a first polymer selected from the group consisting of a nylon, a polyolefin and a polyester; and a sufficient proportion of a second polymer, comprising a polymer of an aziridine compound, to adsorb a pyrogen from said liquid; wherein said mixture is formed by adding said second polymer to a melt of said first polymer and mixing such to form a molten mixture; and then molding said molten mixture into said adsorbent article.

20. An adsorbent as claimed in claim 19 wherein said aziridine polymer is crosslinked.

21. An adsorbent as claimed in claim 19 wherein said article is at least one of fiber, film, sheet, paper, cloth, non-woven fabric, hollow article, particle, foam, block, or honeycomb.

22. An adsorbent as claimed in claim 19 wherein said aziridine compound is at least one member selected from the group consisting of ethyleneimine, propyleneimine, butyleneimine, N-hydroxyethylethyleneimine, N-cyanoethylethylene imine, N-methyl ethyleneimine, N-phenyl ethyleneimine, N-acetyl ethyleneimine, N-methacryloyl aziridine, δ-aziridinylmethyl proprionate, δ-aziridinylmethyl methacrylate, hexamethylene-bis-1,6-N,N'-diethyleneurea, diphenylmethane-bis-4,4'-N,N'-diethyleneurea, and 2,2-bishydroxymethylbutanol-tris[3-(1-aziridinyl)proprionate].

23. An adsorbent as claimed in claim 19 wherein said aziridine polymer comprises the polymerization product of at least 5 weight percent of said aziridine compound and up to 95 weight percent of at least one other compound which is copolymerizable with said aziridine compound.

24. An adsorbent as claimed in claim 19 wherein said polymer of an aziridine compound is a block copolymer formed by block copolymerizing a polymer of an aziridine compound with a vinyl polymer having terminal functional groups reactive with the polymer of the aziridine compound.

25. An insoluble adsorbent, for adsorbing a pyrogen from a liquid containing said pyrogen, comprising:

an article comprising a mixture of:
an aziridine polymer comprising a sufficient amount of aziridine constituent to adsorb pyrogen from said liquid;
in admixture with another polymer that is compatible with said aziridine polymer;
which article is substantially insoluble in said liquid under adsorption conditions,
wherein said admixture contains sufficient other polymer that the aziridine polymer in said mixture is less soluble in said liquid than would be said aziridine polymer if it was not in said admixture.

26. An adsorbent as claimed in claim 25 wherein said aziridine polymer comprises at least one compound selected from the group consisting of ethyleneimine, propyleneimine, butyleneimine, N-hydroxyethylethyleneimine, N-cyanoethylethylene imine, N-methyl ethyleneimine, N-phenyl ethyleneimine, N-acetyl ethyleneimine, N-methacryloyl aziridine, δ-aziridinylmethyl proprionate, δ-aziridinylmethyl methacrylate, hexamethylene-bis-1,6-N,N'-diethyleneurea, diphenylmethane-bis=4,4'-N,N'-diethyleneurea, and 2,2-bishydroxymethylbutanol-tris[3-(1aziridinyl)proprionate].

27. An adsorbent as claimed in claim 25 wherein said aziridine polymer comprises the polymerization product of at least 5 weight percent of said aziridine compound and up to 95 weight percent of at least one other compound which is copolymerizable with said aziridine compound.

\* \* \* \* \*